United States Patent
Steffenson (10) Patent No.: US 8,983,172 B2
(45) Date of Patent: Mar. 17, 2015

(54) VISUAL INSPECTION APPARATUS, SECURE ONE-WAY DATA TRANSFER DEVICE AND METHODS THEREFOR

(71) Applicant: Modern Technology Solutions, Inc., Alexandria, VA (US)

(72) Inventor: Kevin Michael Steffenson, Urbana, OH (US)

(73) Assignee: Modern Technology Solutions, Inc., Alexandria, VA (US)

(*) Notice: Subject to any disclaimer, the term of this patent is extended or adjusted under 35 U.S.C. 154(b) by 186 days.

(21) Appl. No.: 13/730,377

(22) Filed: Dec. 28, 2012

(65) Prior Publication Data

US 2014/0185911 A1 Jul. 3, 2014

(51) Int. Cl.
*G06K 9/00* (2006.01)
*G06T 7/00* (2006.01)

(52) U.S. Cl.
CPC ..... *G06T 7/0046* (2013.01); *G06T 2207/20104* (2013.01); *G06T 2207/30108* (2013.01)
USPC .......................................... 382/141; 382/154

(58) Field of Classification Search
USPC ................................................. 382/154, 141
See application file for complete search history.

(56) References Cited

U.S. PATENT DOCUMENTS

| | | | |
|---|---|---|---|
| 5,412,569 A | 5/1995 | Corby, Jr. et al. | |
| 5,703,562 A | 12/1997 | Nilsen | |
| 5,726,705 A | 3/1998 | Imanishi et al. | |
| 6,052,631 A | 4/2000 | Busch et al. | |
| 6,341,153 B1 * | 1/2002 | Rivera et al. | 378/4 |
| 6,662,088 B1 * | 12/2003 | Hopple et al. | 701/301 |
| 6,736,322 B2 | 5/2004 | Gobburu et al. | |
| 6,877,661 B2 | 4/2005 | Webb et al. | |
| 7,020,580 B2 | 3/2006 | Peters et al. | |
| 7,221,910 B2 | 5/2007 | Ishii et al. | |
| 7,557,736 B1 * | 7/2009 | Daily et al. | 340/995.1 |
| 7,561,729 B2 * | 7/2009 | Willis | 382/141 |
| 7,587,082 B1 | 9/2009 | Rudin et al. | |
| 7,689,062 B2 * | 3/2010 | Baharav et al. | 382/282 |
| 7,739,190 B2 | 6/2010 | Shin et al. | |
| 8,060,835 B2 | 11/2011 | Newcomer et al. | |
| 8,244,631 B2 | 8/2012 | Ueno et al. | |
| 2002/0023027 A1 | 2/2002 | Simonds | |
| 2003/0073901 A1 * | 4/2003 | Simon et al. | 600/424 |
| 2003/0230630 A1 | 12/2003 | Whipple et al. | |
| 2004/0117131 A1 | 6/2004 | Peters et al. | |
| 2004/0257457 A1 | 12/2004 | Stavely et al. | |
| 2005/0064901 A1 | 3/2005 | Park et al. | |
| 2007/0241194 A1 | 10/2007 | Lin et al. | |
| 2008/0189420 A1 | 8/2008 | Herrod et al. | |
| 2008/0267487 A1 | 10/2008 | Siri | |
| 2010/0078482 A1 | 4/2010 | Bradford | |
| 2010/0110074 A1 * | 5/2010 | Pershing | 345/423 |
| 2010/0241380 A1 | 9/2010 | Cookson | |
| 2011/0262026 A1 | 10/2011 | Hori | |
| 2012/0140041 A1 * | 6/2012 | Burgunder et al. | 348/46 |
| 2012/0141136 A1 * | 6/2012 | Blume | 398/140 |
| 2014/0104379 A1 * | 4/2014 | Glasgow | 348/42 |

* cited by examiner

*Primary Examiner* — Utpal Shah
(74) *Attorney, Agent, or Firm* — Armstrong Teasdale LLP (57) ABSTRACT

A visual inspection system includes a database storing a wireframe model of an object and a portable electronic device equipped with an imaging device and a display. The portable electronic device is in communication with the database. The portable electronic device is configured to show on the display the wireframe model as an overlay to an image of the object taken by the imaging device. The display is configured to accept input of a trace of a defect on the display, and displays the trace on the image. A method of transmitting electronic data from an unsecure device to a secure database is also described.

21 Claims, 5 Drawing Sheets

VISUAL INSPECTION APPARATUS, SECURE ONE-WAY DATA TRANSFER DEVICE AND METHODS THEREFOR

FIELD

The field of the disclosure relates generally to inspection and data transfer systems and methods therefor. More particularly, the present disclosure relates to systems and methods for augmenting visual inspection of an object and systems and methods for secure one-way data transfer.

BACKGROUND

The exterior surfaces of aircraft are typically complex surfaces designed for efficient aerodynamics. For military aircraft, the exterior surfaces may be further configured for low observability. In some instances, aircraft exterior surfaces may be covered with a coating configured to reduce the aircraft's electronic (e.g., radar) signature. Such coatings are typically applied to the aircraft in predetermined coverage areas and in predetermined thicknesses depending on the particular aspects of the aircraft.

The external surfaces and coatings of the aircraft are subject to harsh environmental conditions that may damage the surfaces and coatings. For example, bird strikes, hail, and accidental damage may cause dents, scratches, tears or other physical damage to the aircraft surfaces and coatings. Many surfaces of aircraft are precisely configured to exacting standards, such that small imperfections or damage may alter the characteristics of the surface. For example, such damage may reduce the aerodynamic efficiency and/or alter the electronic (e.g., radar) signature of the aircraft.

As such, maintenance operations of the aircraft typically involve visually inspecting the exterior surfaces and coatings of the aircraft to check for damage. During such inspections, an operator or maintenance person may walk around the aircraft and visually inspect the surfaces of the aircraft for irregularities. If any irregularities are found, the operator will write down notes describing the location and extent of the damage/irregularity. After the operator has completed his inspection, and written down all of the damage, the operator then transcribes the data into a computer system. This process is typically a manual process that involves the operator entering text into the computer database using a keyboard and mouse. In some systems, the operator may be presented with a generic drop-down computer menu that may allow the operator to select damage options from a predefined list. However, these predefined lists tend to be incomplete, and cumbersome to use. Once the damage has been entered into the computer, it is typically stored in a database. Such database may be accessed at a later date, in order to make a determination of whether damage found by an operator at a later date is new or was pre-existing.

However, because the inspection process is manual, and relies on operator defined descriptions of damage or predefined options in a drop down menu, the process is time consuming and prone to error. For example, different inspectors may describe the same damage in different ways, which may lead to confusion as to whether a particular damaged surface is new or pre-existing. In other instances, an operator may be constrained to the predefined damage types in a drop down menu, which may not adequately describe the damage, thus forcing the operator to incorrectly describe the damage. Additionally, the operator may not have the tools necessary to accurately measure the location and dimensions of the damage, and thus may not be able to provide adequate descriptions of the damage.

In other situations, defects that are perceived by the operator as being too small or insignificant to repair may not be documented because operators may feel such documentation is unnecessary (i.e., not worth the operator's time to document). However, this lack of documentation contravenes the ability to adequately assess the impact of numerous minor defects which may collectively be a significant issue.

In other inspection systems, such as laser theodolite systems, a complex system of tripod mounted lasers is placed around the aircraft. The lasers are capable of highly accurate measurement of surface defects of the aircraft, however such systems are costly and time consuming to set up. Further, difficulties in aligning the lasers can lead to frustration and error when attempting to use such systems.

In most inspection systems, the data gathered by the operator must be transmitted to a central database for collection and storage. However, this situation becomes complicated when dealing with classified data systems. For example, although the data collected by the operator is in many instances unclassified data, the unclassified data must be input into a classified database. Due to strict requirements, typically electronic devices must be considered classified if they are electronically coupled to a classified computer. For example, an initially unclassified USB memory device must be handled as a classified device once it is inserted into a classified computer. This may be referred to as "contamination" of the unclassified device. Such contamination is possible because the USB memory device is capable of transmitting data into the classified system, and also receiving data from the classified system. Thus, due to possible contamination issues, transferring data from an unclassified device to a classified system can be costly. For this reason, many times the unclassified data is manually input (as described above) using a keyboard or the like into the classified system in order to avoid possible "contamination" of an electronic storage device.

Although reference is made above to aircraft, such circumstances may arise with other vehicles, objects, structures or devices that are inspected, for example, automobiles, rail cars, watercraft, buildings, tools and the like.

Accordingly, there is an unmet need for a visual inspection system and secure data transfer system that remedies existing issues.

BRIEF DESCRIPTION

In one aspect, a visual inspection system includes a database storing a wireframe model of an object and a portable electronic device equipped with an imaging device and a display. The portable electronic device is in communication with the database. The portable electronic device is configured to show on the display the wireframe model as an overlay to an image of the object taken by the imaging device. The display is configured to accept a trace of a defect on the display, and displays the trace of the defect on the image.

In another aspect, a method of recording a defect of an object includes displaying a wireframe model of an object on a portable display and capturing an image of the object with an image capturing device. The wireframe model is displayed as an overlay over the image. The wireframe model is aligned with the image on the display and a defect of the object is traced on the display. At least one of a location and a size of the traced defect is calculated and defects data is stored that represents at least one of the location and size of the defect in a defects database.

In yet another aspect, a method of transmitting electronic data from an unsecure device to a secure database includes converting electronic data into an optically readable code and displaying the optically readable code on a portable display device. A scanner is used to scan the optically readable code. The scanner is in communication with a secure database. The optically readable code is decoded and the decoded data is stored in the secure database.

BRIEF DESCRIPTION OF THE DRAWINGS

The objects, features and advantages of the present disclosure will become more apparent from a reading of the following description in connection with the accompanying drawings.

DETAILED DESCRIPTION

The present disclosure provides systems and methods for augmented visual inspection of an object and secure data transfer. In some embodiments, the present disclosure provides a solution to the longstanding problem of complex, costly and error prone visual inspection systems. In other embodiments, the present disclosure provides a solution to the longstanding problem of transferring data from an unsecured device to secure computer systems without contamination of the unsecured device. As used herein "unsecured" refers to data that is not subject to increased security measures (i.e., unclassified data).

For the purposes of promoting an understanding of the principles of the present disclosure, reference will now be made to embodiments and specific language will be used to describe the same. It will nevertheless be understood that no limitation of the scope of the claims is thereby intended, such alteration and further modifications of the readings of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "an element" means at least one element and can include more than one element.

Unless otherwise defined, all technical terms used herein have the same meaning as commonly understood by one of ordinary skill in the art to which this disclosure belongs.

Figure 1:
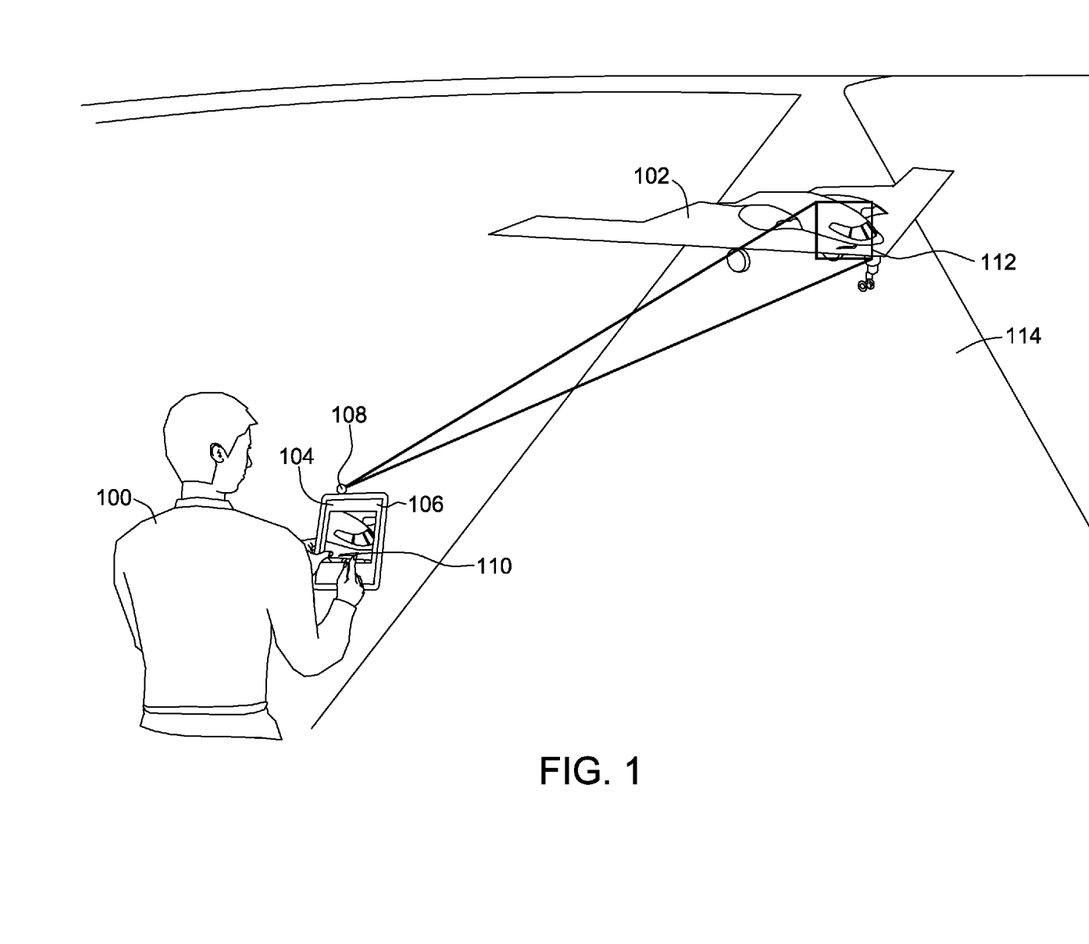
FIG. 1 is a perspective view of a visual inspection system according to an embodiment.
Figure 2:
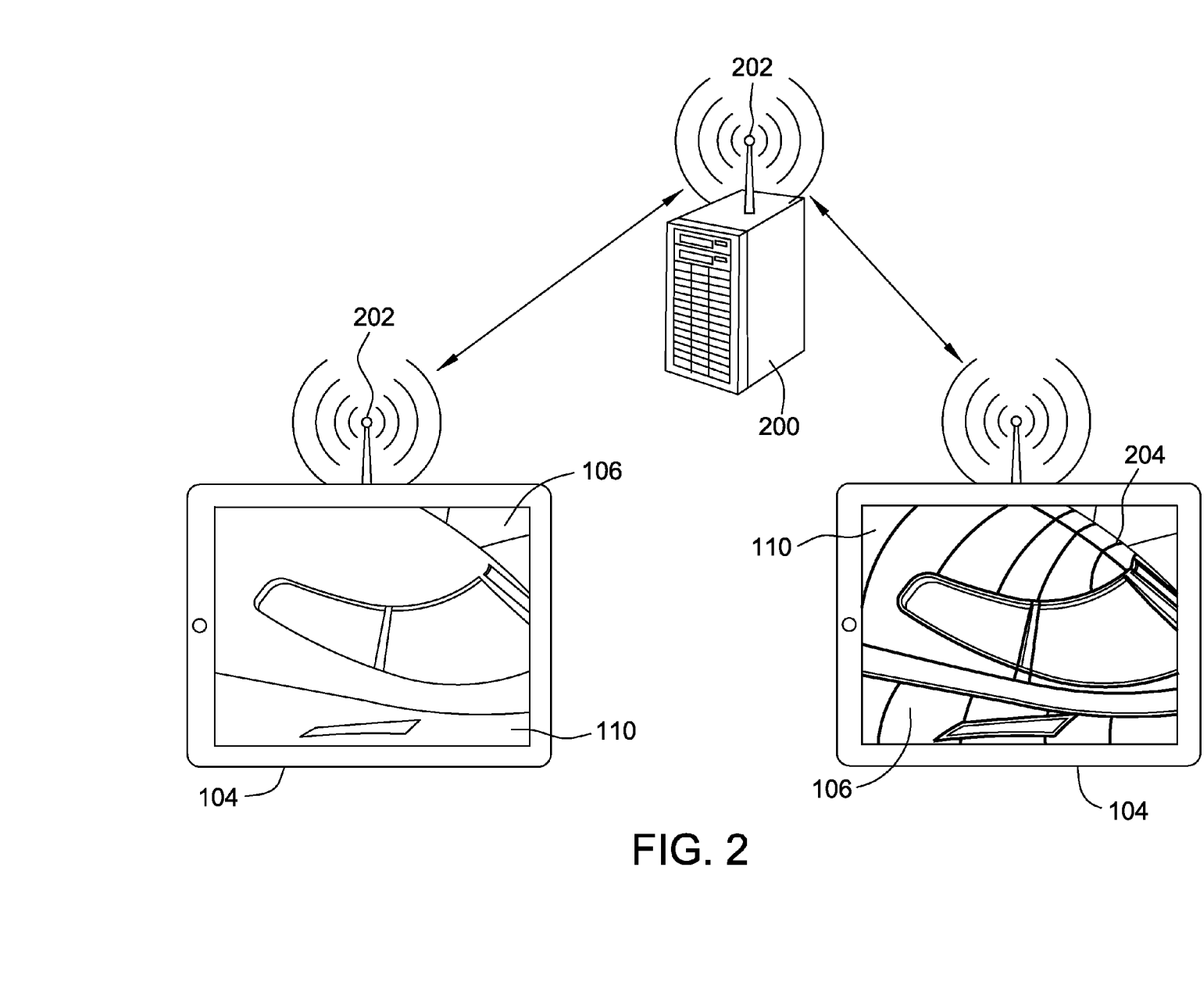
FIGS. 2-3 are schematic views of a visual inspection system according to an embodiment.
Figure 3:
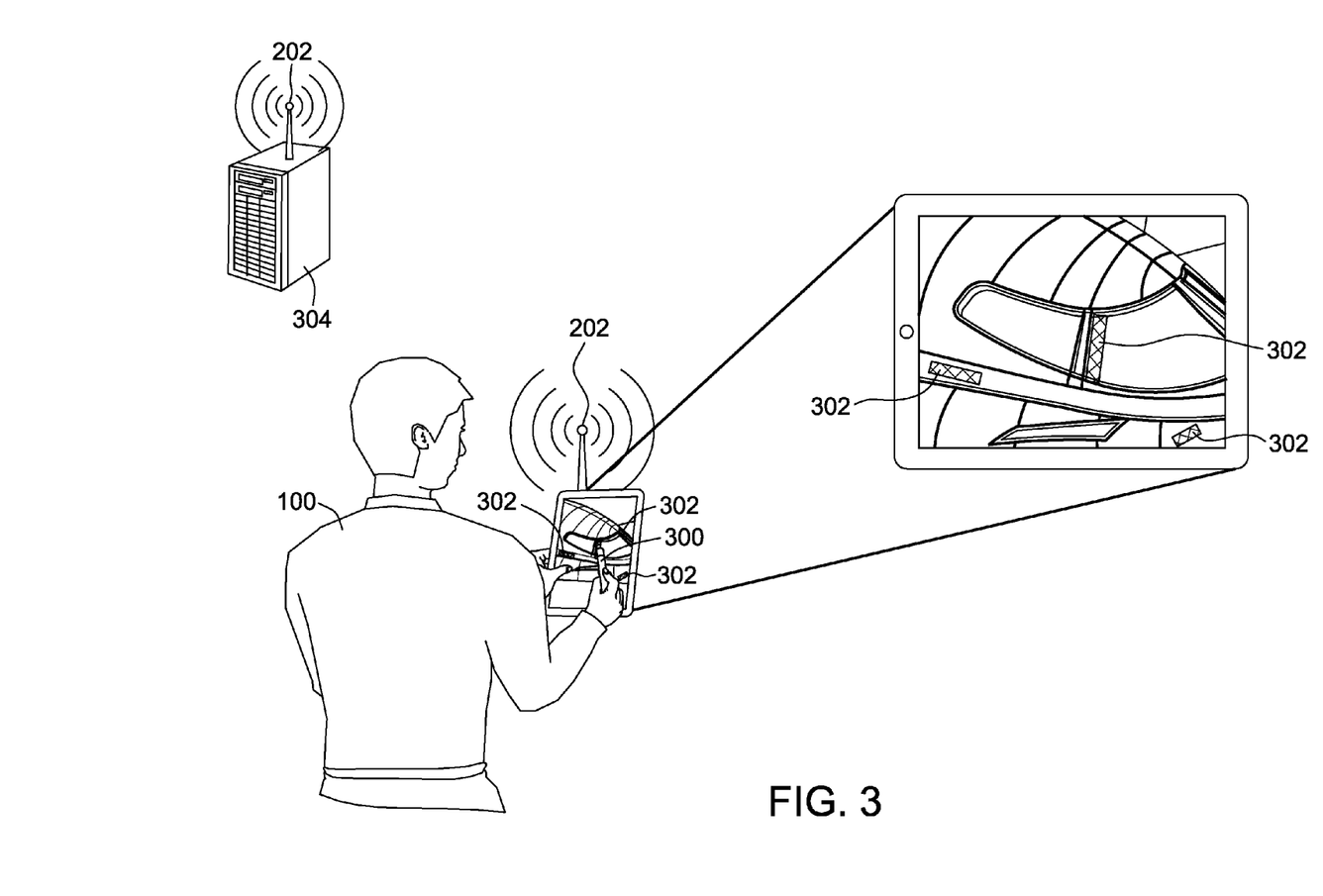

Reference is now made to FIGS. 1-3. As shown in FIG. 1, an inspector 100 is located within visual range of an object 102 to be inspected. In the exemplary embodiment, the object 102 is a low observable aircraft (e.g., a B-2 Spirit Bomber manufactured by Northrop Grumman of Palmdale, Calif., USA) located on a taxiway 114. It is noted that taxiway 114 may be any surface capable of supporting object 102. In other embodiments, object 102 may be any air vehicle, ground vehicle, automobile, rail car, watercraft, building structure, tool or other object to be visually inspected. As used herein, within "visual range" refers to the visual range of a human inspector, at a range capable of visually inspecting object 102 for defects. Typically, visual range of the inspector will be within approximately 1 foot to 10 feet of the object 102, but may be more or less depending on the object to be tested and the visual abilities of the inspector 100.

As shown in FIG. 1, the inspector 100 is equipped with a portable electronic device 104 that includes a display 106 and an imaging device 108. However, it will be appreciated that in some embodiments, imaging device may be separate from portable electronic device 104 but in electronic communication therewith. In the exemplary embodiment, portable electronic device 104 is a tablet computer, but in other embodiments may be any suitable laptop computer, smartphone, or other portable electronic device that allows the system to function as described herein. Display 106 may be any suitable LED, LCD or other display screen that allows the system to function as described herein. The display 106 may be a touch-screen display that allows the inspector 100 to input data by physical contact with the display 106 using a pointing device, for example by use of a finger or stylus 300 (FIG. 3). The imaging device 108 is a camera or the like capable of producing an image 110 of at least a portion of object 102. The imaging device 108 may be capable of imaging in the visible light spectrum, or other spectrum, such as ultraviolet, x-ray, radio, microwave, near infra-red, infra-red or the like and combinations thereof. In this embodiment, imaging device 108 is a digital camera capable of taking a digital image of object 102, in the visible light spectrum, which is viewable on display 106 of portable electronic device 104. The imaging device 108 may include a flash, video camera, infrared camera or other optical enhancements that allow the system to function as described herein. Portable electronic device 104 may include internal memory (not shown), or include a communication port for communication with an external computer memory device, for storage of electronic information.

As illustrated in FIG. 2, portable electronic device 104 is in electronic communication with a wireframe database 200 that stores a wireframe model of at least a portion of the object 102. Of course, wireframe database 200 may store a plurality of wireframe models of numerous objects to be inspected. As used herein, "electronic communication" refers to any mode of electronic communication that provides the ability to transfer data between the portable electronic device 104 and the database 200. In one embodiment, the portable electronic device 104 and the database 200 are in electronic communication over a Wi-Fi network, using one or more wireless transceivers 202. In other embodiments, the devices are in electronic communication via physical wires or cables or the like. In yet other embodiments, wireless technologies such as Bluetooth®, infrared, radiofrequency or the like may be utilized to provide the electronic communication. In yet other embodiments, the wireframe database 200 is integrated within, or saved to a computer memory of, portable electronic device 104.

The wireframe model 204 may be a full or partial wireframe model of the object 102. Wireframe models, such as CAD models, are generally known in the art, and are not discussed in detail herein. The detail of the wireframe model 204 is sufficient such that a landmark of the aircraft is discernible to the inspector 100 viewing the wireframe model 204 on display 106. As used herein, a "landmark" is a portion of the object 102 that is readily identifiable, such as a window, doorframe, wing, or other aspect of the object capable of identification by the operator.

In use, the inspector 100 is located within visual range of object 102. Inspector 100 aims imaging device 108 at object 102 in order to take an image 110 of the object. The inspector may, in some instances take a plurality of images of different portions of the object 102. As will be appreciated by one of skill in the art, the operator 100 takes at least one image of an area 112 of object to be visually inspected (FIG. 1). The portable electronic device 104 allows the inspector to view the image 110 on the display 106. In some embodiments, the imaging device may image the device in more than one spectrum (e.g., visible, ultraviolet and infrared), or utilize a physical or digital filter to enhance, or supplement, the image 110 such that defects not visible to the human eye are more readily detected by the inspector 100. The portable electronic device 104 includes a processor configured to allow the user to conduct operations such as zooming, panning and rotating of the image 110.

Before, or after, the operator has taken image 110, the operator initiates a communication with wireframe database 200 in order to retrieve a wireframe model 204 of the object 102. The retrieved wireframe model 204 is viewable on display 106, as shown for example in FIG. 2. The portable electronic device 104 includes a processor configured to allow the user to conduct operations such as zooming, panning and rotating of the wireframe model 204. In one embodiment, the wireframe model 204 is shown as an overlay on image 110.

In one embodiment, the operator takes the image 110 of the object 102 and views it on display 106. Subsequently, the wireframe model 204 is shown as an overlay on image 110. In another embodiment, the wireframe is initially viewed on the display 106, and the operator then takes an image of the object 102. In some instances, the wireframe overlay will not initially be aligned with image 110. In such instances, the operator may filter the image, for example in colors by wavelength or frequency, and/or adjust the brightness, contrast or other image parameters, and/or utilize the zoom, pan and rotate features on either, or both, of the image 110 and the wireframe model 204 until the wireframe model is displayed in alignment with the image 110, as shown for example in FIG. 2. As used herein, "in alignment" refers to the landmarks of the wireframe substantially overlaid on the similar landmarks of the object, for example, the wireframe window openings will align with the actual window opening of the image 110. In yet another embodiment, the processor of the portable electronic device 104 may be configured with an alignment module that automatically aligns the wireframe model with the image. For example, the alignment module may provide a "snap-to" capability, wherein when the wireframe image is within a predetermined distance of alignment with the image 110, the processor automatically snaps the wireframe model to the properly aligned position.

Once the operator 100 has properly aligned the wireframe model 204 over the image 110, the operator may begin marking defect locations using the display 106. In one embodiment, the user uses a marking device 300, such as a stylus, to trace a defect location 302 on the display 106 (FIG. 3). In another embodiment, the portable electronic device includes a processor configured to automatically detect a defect location 302 and show a trace of the defect location 302 on the display 106. The traced location of the defect location 302 is converted to defect data that is initially stored within memory associated with portable electronic device 104. In another embodiment, the defect data may be transmitted in real-time, or at a later time, to a remotely located defects database 304 by way of an electronic communication, such as a secure data transmission as discussed below herein.

The portable electronic device 104 may include one or more modules that allow the user to input additional defect data to be stored with the defect location data. For example, the operator 100 may input additional data (e.g., metadata) such as the date and time of the inspection, depth, size, color, type, number of layers impacted, material or the like. In one embodiment, the metadata is input via a dropdown menu that allows the user to select one or more parameters associated with the defect, or object 102. Such metadata may be stored with the defect location data in the defects database 304. In other embodiments, the processor may automatically add a predefined set of metadata to the defects location data, such as an object identification number (e.g., an aircraft tail number), date and time of the inspection or the like.

In another embodiment, the operator 100 may place a defect identifier directly on the defect location 302 of the object 102 before taking the image. For example, the inspector may place a sticker, or paint, on the defect location in order to trace the defect. As used herein, the term "trace" is used to refer to an operator tracing the defect electronically on the portable electronic device or physically using paint or tape or the like on the object 102 itself. Subsequently, the image 110 taken by the operator 100 will include the defect identifier on the image itself. The processor of the portable electronic device 104, may then be configured to automatically detect the defect identifier, and automatically record the defect location data based upon the defect identifier.

In one embodiment, the processor may be configured to automatically calculate the size and/or location of the defect location 302. For example, the processor may compare the defect location 302 to at least three points of the wireframe model to calculate the size/location using triangulation, or the like.

In another embodiment, the defect locations 302 are stored together with the wireframe model 204. Thus, when an inspector retrieves the wireframe model at a subsequent time, the defects locations 302 will be viewable on the wireframe model, thus allowing the inspector to know that a particular defect was previously recorded. In another aspect, the system is configured such that the inspector is capable of modifying a previously recorded defect location, for example if the defect has changed in size and/or shape.

Figure 5:
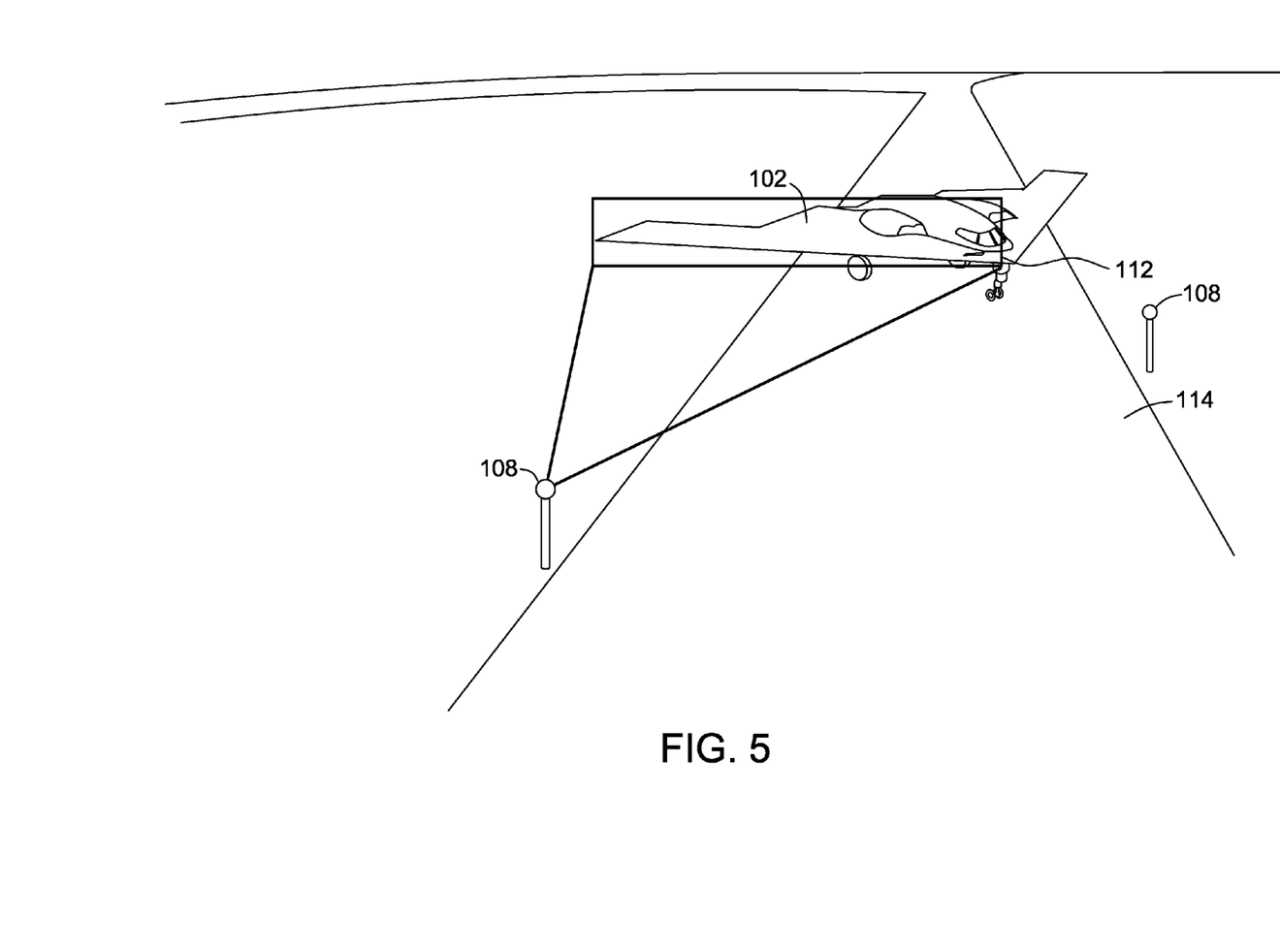
FIG. 5 is a perspective view of a visual inspection system according to another embodiment.

In another embodiment, as shown in FIG. 5, an imaging device 108 is placed in proximity to the object 102 to be inspected, such that it is able to capture an image of substantially an entire side surface of the object. However, in other embodiments, multiple imaging devices 108 may be placed in proximity to the object 102 to be inspected such that each imaging device is positioned to capture an image of a section of the object, such that substantially the entire outer surface of the object is imaged. In such embodiments, a series of images may be captured as the object passes by the imaging devices 108. For example, it is contemplated that a series of images are taken by imaging devices 108 as an aircraft passes by the imaging devices 108 on a taxiway 114. The series of images may be compiled such that substantially the entire outer surface of the object 102 is captured in the compiled image.

In the embodiment shown in FIG. 5, the imaging devices 108 are placed atop a stationary mount. However, the imaging devices 108 may be incorporated into a portable electronic device as discussed above, or coupled to a portable or removable structure. In one suitable embodiment, at least one imaging device 108 is placed adjacent to the taxiway 114. In this embodiment, as the aircraft passes near the imaging device 108, such as during taxi or takeoff operations, one or more images are captured by image capturing device 108 as discussed above. The images captured by imaging device 108 may be saved in a computer memory of the imaging device 108, or transmitted by wire or wirelessly to a remote computer (not shown). The captured images may be analyzed real-time by an operator 100 at the remote computer. As used herein, the term "real-time" refers to analysis being conducted at approximately the same time the images are being captured. In other embodiments, the captured images may be stored and analyzed at a later time. In one embodiment, current images captured of the object 102 are compared to prior images of the object 102 to determine if any new defects have developed. For example, current images of the aircraft taken after the aircraft lands from a mission may be compared to prior images of the aircraft taken before takeoff of the mission. The comparison step may be conducted manually by an operator reviewing the current and prior images, or by a computer processor configured to automatically compare the current to the prior images and automatically trace any defects found, or highlight potential areas that may include defects so that the operator can focus on the highlighted areas and trace the defects.

Figure 4:
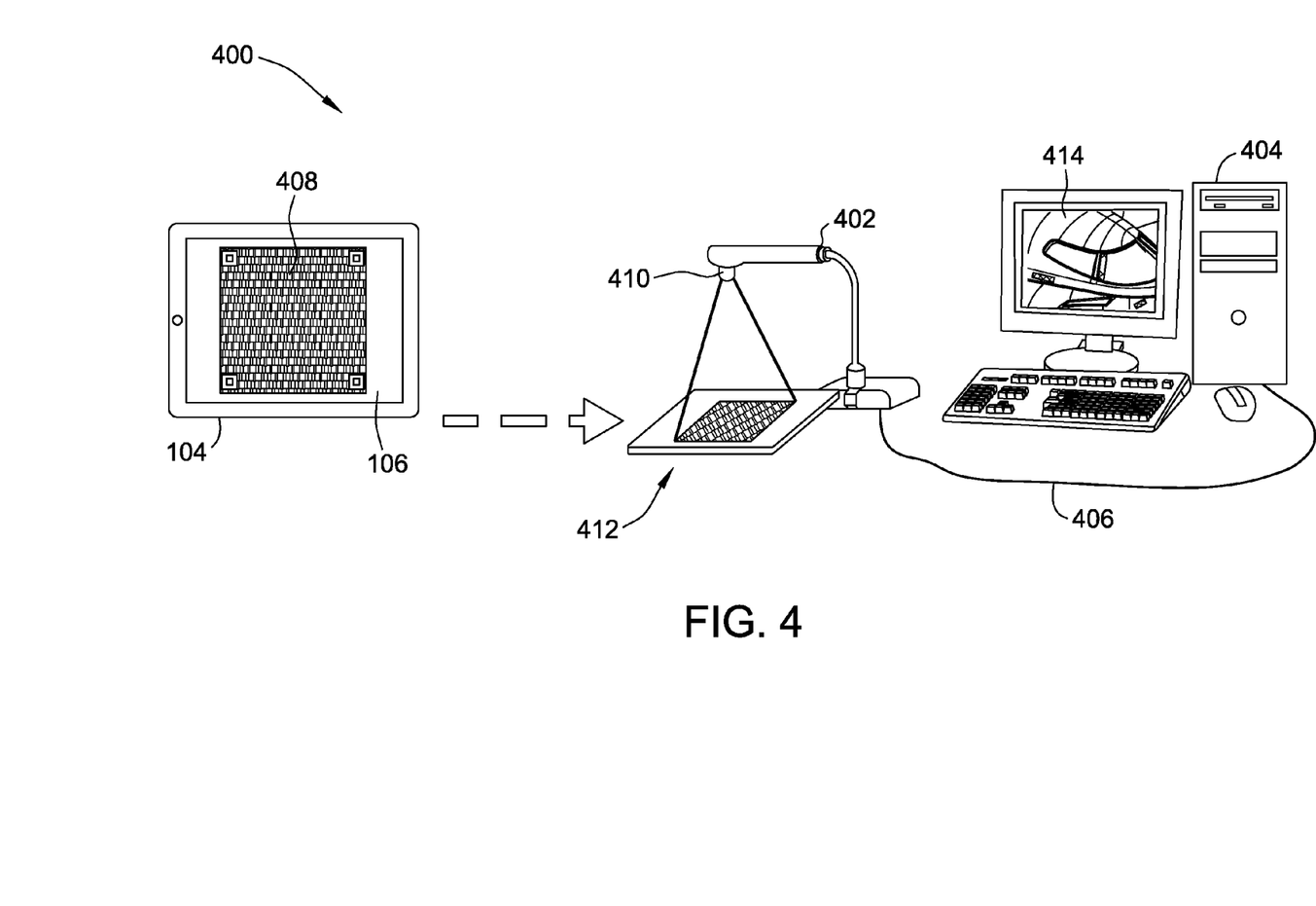
FIG. 4 is a schematic view of a secure data transfer system according to an embodiment.

Referring now to FIG. 4, a secure one-way data transfer system 400 is described. The exemplary system includes the portable electronic device 104, a scanner 402 and a secure computer 404. As referred to herein, "secure" refers to a high security computer system, such as a Government classified computer system or the like. In the exemplary embodiment, scanner 402 is a smart code reader, but may be any scanner capable of allowing the system 400 to function as described herein. For example, in other embodiments, the scanner 402 may be a bar code scanner, code scanner, optical character recognition (OCR) scanner or the like. Scanner 402 is in electronic communication with secure computer 404. In the exemplary embodiment, scanner 402 is in electronic communication with secure computer 404 by way of cable 406. However, in other embodiments, scanner 402 may be coupled securely to secure computer 404 by any suitable secure wired or wireless data connection.

In operation, the portable electronic device 104 processes unsecure data, such as the defect data discussed above, to produce a code 408. Code 408 is an optical machine-readable representation of data relating to the unsecure data. Code 408 may be a barcode, smart code, or other suitable electronic code that allows the system to function as described herein. As used herein, the term "code" refers to a symbol representative of data that is not readily ascertainable by a human without the use a computer to decode the data.

After portable electronic device 104 has processed the unsecure data into code 408, the code is viewable on display 106. The data is transferable to secure data system 404 by way of scanner 402. In this embodiment, portable electronic device 104 is placed in position 412 such that display 106 is oriented facing the optical reader 410 of scanner 402. Scanner 402 is activated, either automatically upon detection of the portable electronic device being placed in position 412, or manually activated by an operator. Once activated, the scanner 402 scans code 408. The scanner 402 thereby reads code 408. In one embodiment, upon reading code 408, scanner 402 transmits code data to secure computer 404. In this embodiment, secure computer 404 is configured to decode the code 408 back into the defect data. In another embodiment, scanner 402 is configured to decode the code 408 back into the defect data, and transmit the decoded data to secure computer 404. The decoded data may then be stored in a secure computer memory of secure computer 404, and/or displayed on secure display 414.

In this embodiment, when portable electronic device 104 displays code 408 on display 106, portable electronic device is configured such that it cannot receive data from secure computer 404 or scanner 402. In this manner, it is possible to provide secure one-way data transfer from portable electronic device 104 to secure computer 404.

In another embodiment, the unsecure data may be of a size such that a single code cannot represent the entirety of the unsecure data. In this embodiment, the portable electronic device 104 is configured to produce a plurality of codes that each represent a portion of the unsecure data, and the sum of the codes together represents the entirety of the unsecure data. In this embodiment, when the portable electronic device 104 is placed in position 412, the scanner 402 may sequentially scan each of the plurality of codes, until all such codes have been read. The advancement of codes may be activated by a timer, user control (i.e., by pushing a button on portable electronic device 104) or the like. In another aspect, the advancement of codes may be facilitated by the portable electronic device receiving a signal from the scanner 402 to advance. For example, the scanner may emit a signal, such as an optical signal (e.g., a flash of light) or other wired or wireless signal, to be received by the portable electronic device 104. At such time that the portable electronic device 104 receives the signal (e.g., by way of imaging device 108), the portable electronic device automatically advances to display the next code. In such embodiments, each of the codes may be individually decoded before being stored in memory or displayed, or alternatively all or a portion of the codes may be combined before being decoded at once.

In some embodiments, the above described systems and methods incorporate a computer, or are computer controlled. The computer related embodiments described herein are not limited to any particular system controller or processor for performing the processing tasks described herein. The term controller or processor, as used herein, is intended to denote any machine capable of performing the calculations, or computations, necessary to perform the tasks described herein. The terms controller and processor also are intended to denote any machine capable of accepting a structured input and of processing the input in accordance with prescribed rules to produce an output. It should also be noted that the phrase "configured to" as used herein, with reference to a computer or processor, means that the processor is equipped with a combination of hardware and software for performing the tasks of embodiments of the invention, as will be understood by those skilled in the art. The term processor, as used herein, refers to central processing units, microprocessors, microcontrollers, reduced instruction set circuits (RISC), application specific integrated circuits (ASIC), logic circuits, and any other circuit or processor capable of executing the functions described herein.

The computer implemented embodiments described herein embrace one or more computer readable media (e.g., memory), including non-transitory computer readable storage media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Aspects of the disclosure transform a general-purpose computer into a special-purpose computing device when configured to execute the instructions described herein. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

A computer or computing device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

This written description uses examples to disclose the embodiments, including the best mode, and also to enable any person skilled in the art to practice the embodiments, including making and using any devices or systems and performing any incorporated methods. Each of the systems and methods disclosed herein incorporate one or more features that may be used separately or combined with any other features of the other embodiments. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A visual inspection system, comprising:
    a database storing a wireframe model of an object; and
    a portable electronic device equipped with an imaging device and a display, the portable electronic device being in communication with the database;
        wherein the portable electronic device is configured to show on the display the wireframe model as an overlay to an image of the object taken by the imaging device; and
        wherein the display is configured to accept a trace of a defect on the display, and displays the trace on the image.

2. The system according to claim 1, wherein the portable electronic device is configured to rotate, pan and zoom at least one of the wireframe and the image for aligning the wireframe with the image.

3. The system according to claim 1, wherein the wireframe model includes a plurality of landmarks, the landmarks representing predetermined physical features of the object.

4. The system according to claim 1, wherein the display is configured to accept a trace by directly contacting the display.

5. The system according to claim 1, further comprising a defects database, the defects database configured to store defects data representing the trace.

6. The system according to claim 1, further comprising a defect measurement module configured to calculate at least one of a size and location of a defect based upon the trace.

7. The system according to claim 6, wherein the defect measurement module is configured to determine the location by calculating a relative location of the trace to at least three locations of the wireframe model.

8. A method of recording a defect of an object, comprising:
    displaying a wireframe model of an object on a portable display;
    capturing an image of the object with an image capturing device;
    displaying the wireframe model as an overlay over the image;
    aligning the wireframe model with the image on the display;
    tracing a defect of the object on the display;
    calculating at least one of a location and a size of the traced defect; and
    storing defects data representing the at least one of the location and size of the defect in a defects database.

9. The method according to claim 8, wherein the aligning includes at least one of rotating, panning or zooming of the image or wireframe model.

10. The method according to claim 8, wherein tracing the defect includes using a pointing device to contact the display.

11. The method according to claim 8, further comprising receiving the wireframe model at the portable display from a wireframe model database.

12. The method according to claim 8, further comprising identifying a landmark indicator on the object and aligning the wireframe model using the landmark indicator.

13. The method according to claim 8, wherein the calculating comprises calculating a relative location of the traced defect to at least three locations of the wireframe model.

14. The method according to claim 8, further comprising transmitting the defects data to a secure database using a one-way data transfer device.

15. The method according to claim 8, further comprising:
    converting electronic data into an optically readable code;
    displaying the optically readable code on a portable display device;
    using a scanner to scan the optically readable code, the scanner in communication with a secure database;
    decoding the optically readable code;
    storing the decoded data in the secure database.

16. The method according to claim 15, wherein the secure database is a U.S. Government classified database.

17. The method according to claim 15, wherein the optically readable code is a smart bar code, and the electronic data represents the defects data, the object being a low observable aircraft.

18. The method according to claim 15, further comprising:
    converting the electronic data into a plurality of optically readable codes;
    sequentially displaying each of the plurality of optically readable codes, and scanning each of the displayed codes.

19. The method according to claim 18, further comprising transmitting an indicator from the scanner to the portable display between each of the plurality of codes being displayed.

20. The method according to claim 15, further comprising recording the defect of the object as the electronic data.

21. A visual inspection system, comprising:
    a database storing a wireframe model of an object;
    a portable electronic device equipped with an imaging device and a display, the portable electronic device being in communication with the database; and
    an alignment module configured to automatically align the wireframe model with an image of the object taken by the imaging device image;

wherein the portable electronic device is configured to show on the display the wireframe model as an overlay to the image of the object; and wherein the display is configured to accept a trade of a defect on the display, and displays the trace on the image.

* * * * *